United States Patent
Petzold

(10) Patent No.: US 6,886,425 B2
(45) Date of Patent: May 3, 2005

(54) ELECTROMAGNETIC SHIFT ARRANGEMENT

(75) Inventor: Rainer Petzold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/203,595

(22) PCT Filed: Feb. 15, 2001

(86) PCT No.: PCT/EP01/01676
§ 371 (c)(1),
(2), (4) Date: Aug. 8, 2002

(87) PCT Pub. No.: WO01/63151
PCT Pub. Date: Aug. 30, 2001

(65) Prior Publication Data
US 2003/0010144 A1 Jan. 16, 2003

(30) Foreign Application Priority Data
Feb. 21, 2000 (DE) .......... 100 07 847

(51) Int. Cl.⁷ .......... F16H 30/38; F16D 19/00
(52) U.S. Cl. .......... 74/339; 192/84.92
(58) Field of Search .......... 74/339; 192/84.2, 192/84.92, 84.3, 48.2, 48.91, 84.93, 69.91

(56) References Cited

U.S. PATENT DOCUMENTS

| | | | | |
|---|---|---|---|---|
| 3,175,665 A | * | 3/1965 | Albrecht | 192/48.2 |
| 4,561,520 A | * | 12/1985 | Fogelberg | 180/84.92 |
| 4,984,668 A | * | 1/1991 | Onishi et al. | 192/84.92 |
| 5,052,534 A | | 10/1991 | Gustin et al. | 192/53 D |
| 5,080,214 A | | 1/1992 | Fossum | 192/84 R |
| 5,435,201 A | * | 7/1995 | Preston et al. | 192/84.92 |
| 5,460,060 A | | 10/1995 | Nellums | 74/473 R |
| 5,802,915 A | * | 9/1998 | Organek et al. | 192/84.92 |
| 6,165,095 A | * | 12/2000 | Till et al. | 475/150 |
| 6,427,550 B1 | * | 8/2002 | Bowen | 74/339 |

FOREIGN PATENT DOCUMENTS

| | | | |
|---|---|---|---|
| CH | 250 456 | 8/1948 | |
| DE | 1 020 873 | 12/1957 | |
| DE | 32 43 431 A1 | 5/1984 | F16D/27/10 |
| DE | 41 35 435 A1 | 5/1992 | F16D/27/10 |
| EP | 0 809 049 A1 | 11/1997 | F16H/63/30 |
| FR | 2 583 489 | 12/1986 | F16H/5/22 |
| GB | 884233 | 12/1961 | |
| JP | 56147929 A | * 11/1981 | F16D/27/02 |
| JP | 57127127 A | * 8/1982 | F16D/27/02 |
| JP | 03260438 | 11/1991 | F16H/3/08 |

* cited by examiner

Primary Examiner—Roger Pang
(74) Attorney, Agent, or Firm—Davis & Bujold, P.L.L.C.

(57) ABSTRACT

An electromagnetic shift arrangement for a transmission (2) with gear wheels (4, 6) arranged on a gear shift (12) rotatable about an axis (20) which can be non-rotatably connected with the gear shaft (12) to form a ratio step via an axial movement of a shift dog (18) along the axis (20). An electromagnetic device (24, 26, 40) is provided which is adequate for axial movement of the shift dog (18) along the axis (20). The electromagnetic device (24, 26, 40) is disposed in the area of the shift dog (18) and acts upon the shift dog (18) directly without shift fork.

14 Claims, 1 Drawing Sheet

ELECTROMAGNETIC SHIFT ARRANGEMENT

FIELD OF THE INVENTION

The invention relates to a shift arrangement for a vehicle transmission.

BACKGROUND OF THE INVENTION

An electromagnetically activated shift arrangement for a transmission has been disclosed in U.S. Pat. No. 5,460,060. For each ratio pair to be shifted between which one shift arrangement is located there is provided here a shift fork situated upon a rod and meshing in a shift dog. A gear shaft upon which are rotatably situated the gear wheels of the relevant ratio can be connected each time with one of the gear wheels by the axial movement of the shift dog. Upon the rod is located the shift fork by means of which a respective laterally placed spring is forced to a middle position out of which it can be axially moved after activation of one magnet. The shift fork here moves axially opposite to the direction of the activated magnet. The ratio is switched off after termination of the activation of the magnet by the respective spring. The shift arrangement has the disadvantage of being structurally designed with a high mass to be moved. The shift arrangement is switched off only by the tension of the springs provided.

The problem on which the invention is based is to overcome the disadvantages of the prior art and show a shift arrangement in which the masses to be moved during the shift are as small as possible.

SUMMARY OF THE INVENTION

According to the invention an electromagnetic shift arrangement is proposed for a transmission having gear wheels rotatably disposed upon a gear shaft around an axis. To form a ratio step, the gear wheels are non-rotatably connectable with the gear shaft by an axial movement of a shift dog along the axis of rotation of the gear shaft. The shift arrangement also has an electromagnetic device suitable for axial movement of the shift dog along the axis. The electromagnetic device is situated directly in the area of the shift dog and acts upon the shift dog directly without assistance and intercalation of a shift fork. The electromagnetic device thus acts directly upon the shift dog and makes possible for a significant reduction of the masses to be moved during the shift operation. Experience has shown that relatively strong shift forces are needed, especially for switching off a ratio step. The disconnecting forces needed depend on the masses to be shifted and on the shifting speed that can be achieved. The smaller the masses to be shifted and the higher the shift speed achievable are, the smaller the shift force can be. In suitably dimensioned electromagnetic devices, it is thus possible to implement extremely short shift times which can be accomplished specially in case of gear shifts in uneven roads. In one development, by adequate control of the electromagnetic device, it is possible to adjust different load reduction times which ensure a long load reduction time, for example, in the course of an even road and shorter load reduction times in an inclination of the road without which control a disadvantageous speed decrease of the vehicle and in the most unfavorable case a rolling back of the vehicle could be associated. In one advantageous development, an electromagnetic device is provided for each axial direction of movement along the axis of the gear shaft which has the gear wheels to be shifted. An advantageous embodiment of the invention shows that the magnetic field to be generated in the electromagnetic device is reversible in its action. It is thus possible, to implement a control of the magnetic fields in different operational directions in order to produce movements of the shift dog in both directions along the axis. This results in that in an advantageous development that only one electromagnetic device is provided for both directions of movement along the axis. In one development, by the control of the magnetic fields, a reversal of the magnetic field can be produced to form a damping device against an impact of the shift dog and in another advantageous development, the shift dog is kept in neutral position by the electromagnetic device. In one embodiment, the shift dog is kept in neutral position by spring tension. One embodiment finally shows that the electromagnetic devices are mounted fixed to the housing and electric feed lines are provided in or on the housing of the transmission. The electromagnetic devices are magnetically insulated in relation to parts of the transmission not to be shifted.

BRIEF DESCRIPTION OF THE DRAWING

The invention will now be described, by way of example, with reference to the accompanying drawing in which.

DETAILED DESCRIPTION OF THE INVENTION

Figure 1:
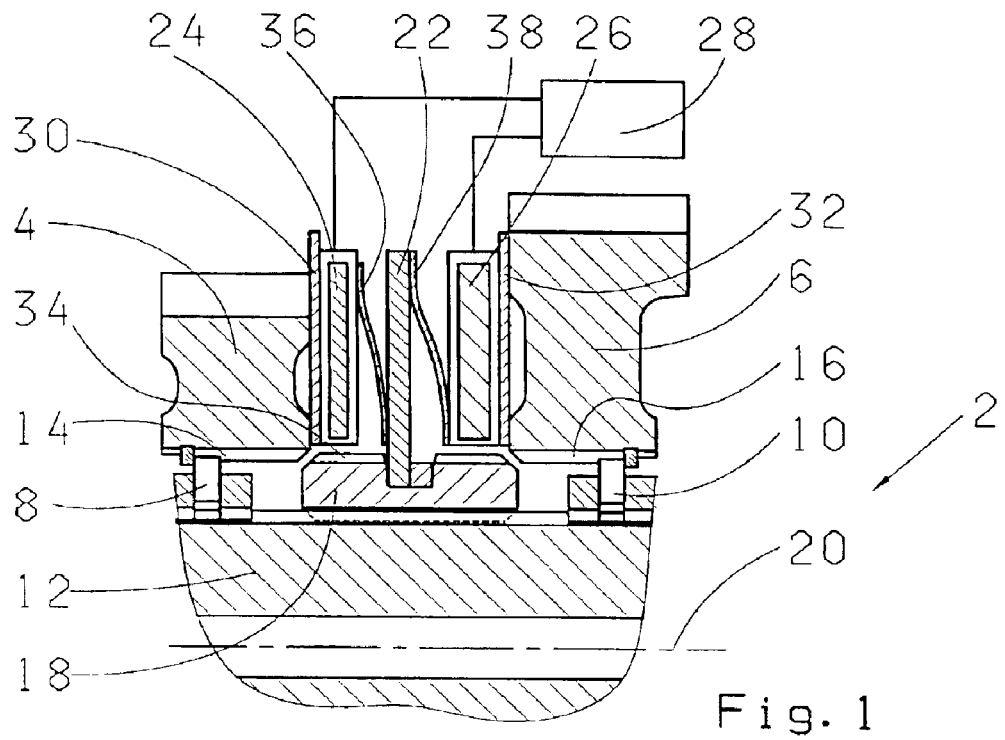
FIG. 1 shows two electromagnetic devices for two ratio steps.

FIG. 1 shows a section from a transmission 2. A first gear wheel 4 and a second gear wheel 6 are rotatably supported by bearings 8, 19 upon a gear shaft 12. The gear wheels 4, 6 have one internal toothing 14, 16, respectively. A shift dog 18 is non-rotatable, but axially displaceable along an axis 20 of the gear shaft 12. A disc 22 meshes in the shift dog 18 or is designed integral therewith. Upon each side of the disc 22 is situated one electromagnetic device 24, 26, respectively, which is stationarily fixed to the housing of the transmission in a manner not show here. The electromagnetic devices 24, 26 are connected with a control device 28. Between the electromagnetic devices 24, 26 and the relevant gear wheels 4, 6 one electromagnetic insulating disc 30 and 32 is provided.

For non-rotatable connection of the gear wheel 4 with the gear shaft 12 and for the formation produced thereby of a ratio step of the transmission 2, the shift dog 18 is axially displaceable to the left along the axis of the plane of the drawing. This occurs by control of the electromagnetic device 24 by the control device 28. The electromagnetic device generates a magnetic field by which the disc 22 is drawn in direction to the gear wheel 4. An external toothing 34 on the shift dog 18 then meshes in the internal toothing 14 of the gear wheel 4. Thereby the gear wheel 4 is non-rotatably connected with the gear shaft 12. To assist the movement of the shift dog 18 in direction to the gear wheel 4, the electromagnetic device 26 can also be controlled. In the electromagnetic device 26 is likewise generated a magnetic field which is oriented so that it ejects the disc 22 in direction to the gear wheel 4. Thereby the electromagnetic devices can be developed accordingly small or the shift force be accordingly increased.

To break up the non-rotatable connection, the electromagnetic device 24 is controlled so that the disc 22 is ejected and thus the toothing 34 of the shift dog 18 detaches itself from the toothing 14 of the gear wheel 4. It is also possible here to provide an adequate assistance by the electromagnetic device 26 by the magnetic field of which the disc 22 is then drawn in direction to the gear wheel 6.

If the shift dog 18 should remain in the neutral position between the two gear wheels 4, 6, this can take place by an adequate control of both electromagnetic devices 24 and 26. The two magnetic fields then generated can keep the disc 22 either in a drawing or an ejecting manner and thus retain the shift dog 18 in a neutral intermediate position. The intermediate position can also be brought about by two plate springs 36, 38 lying between the disc 22 and the respective electromagnetic device 24, 26. If the disc 22 moves in one or the other direction, the plate springs 36, 38 are accordingly compressed.

A connection of the gear wheel 6 with the gear shaft 12 by switching off the neutral position accordingly occurs in inverse manner.

Figure 2:
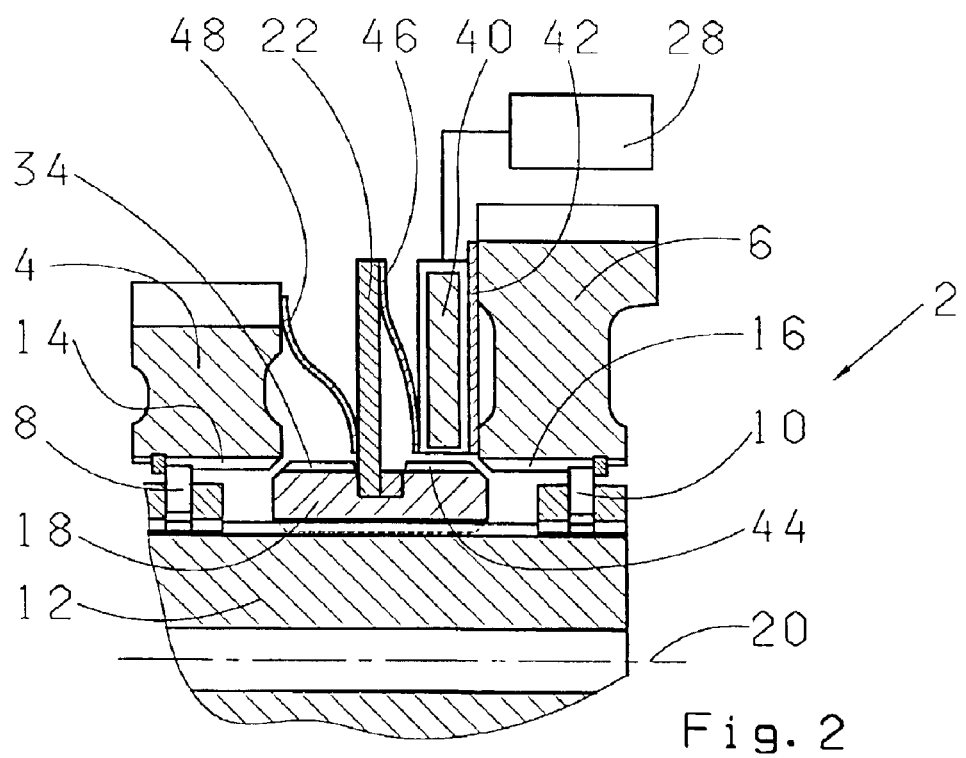
FIG. 2 shows one electromagnetic device for two ratio steps.

FIG. 2 shows a section from a transmission 2. A first gear wheel 4 and a second gear wheel 6 are non-rotatably supported upon a gear shaft 12 by the bearings 8, 10. The gear wheels 4, 6 have respective internal toothings 14, 16. A shift dog 18 is non-rotatable, but axially displaceable along an axis of rotation 20 of the gear shaft 12. A disc 22 meshes in the shift dog 18 or is designed integral therewith. Upon one side of the disc 22 is situated an electromagnetic device 40 which is stationarily fastened on the housing of the transmission in a manner not shown here. The electromagnetic device 40 is connected with a control device 28. An electromagnetic insulating disc 42 is provided between the electromagnetic device 40 and the gear wheel 6.

In the plane of the drawing, the shift dog 18 is axially displaced to the right along the axis 20 for non-rotatable connection of the gear wheel 6 with the gear shaft 12 and for the formation thereby produced of a ratio step of the transmission 2. This occurs by the control of the electromagnetic device 40 by the control device 28. The electromagnetic device 40 generates a magnetic field by which the disc 22 is drawn in direction to the gear wheel 6. An external toothing 44 on the shift dog 18 meshes then in the internal toothing 16 of the gear wheel 6 during synchronous rotational speeds of the shift dog 18 and the gear wheel 6. The gear wheel 6 is thereby non-rotatably connected with the gear shaft 12.

To dissolve the non-rotatable connection, the electromagnetic device 40 is controlled so that the disc 22 is ejected and thus the toothing 44 of the shift dog 18 detaches itself from the toothing 16 of the gear wheel 6. A support by a plate spring 46 provided between disc 22 and electromagnetic device 40 can result whereby the disc 22 is ejected in direction toward the gear wheel 4.

If the shift dog 18 must be kept in the neutral position between both gear wheels 4, 6, this can occur by an adequate control of the electromagnetic device 40. The magnetic field then generated can keep the disc 22 either in a drawing or an ejecting manner and thus the shift dog 18 in a neutral intermediate position. The intermediate position can be produced also by two plate springs 46,48. The plate spring 46 is between the disc 22 and the electromagnetic device 40 and the plate spring 48 lies between the disc 22 and the gear wheel 4. When the disc 22 moves in one or the other direction, the plate springs 46, 48 are accordingly compressed.

The gear wheel 4 is connected with the gear shaft 12 by switching off from the neutral position by control of the electromagnetic device 40 by the control device 28 in a manner such that an ejecting magnetic field is generated and the disc 22 and therewith the shift dog 18 is ejected from the electromagnetic device 40 in direction to the gear wheel 4. The external toothing 34 on the shift dog 18 meshes then in the internal toothing 14 of the gear wheel 4 during synchronous rotational speeds of the shift dog 18 and the gear wheel 4. Thereby the gear wheel 4 is non-rotatably connected with the gear shaft 12.

| Reference numerals |
|---|
| 2 transmission |
| 4 gear wheel |
| 6 gear wheel |
| 8 bearing |
| 10 bearing |
| 12 gear shaft |
| 14 internal toothing |
| 16 internal toothing |
| 18 shift dog |
| 20 axis |
| 22 disc |
| 24 electromagnetic device |
| 26 electromagnetic device |
| 28 control device |
| 30 insulating disc |
| 32 insulating disc |
| 34 external toothing |
| 36 plate spring |
| 38 plate spring |
| 40 electromagnetic device |
| 42 insulating disc |
| 44 external toothing |
| 46 plate spring |
| 48 plate spring |

What is claimed is:

1. An electromagnetic shift arrangement for a transmission (2) comprising:
    a first gear wheel (4) and a second gear wheel (6) rotatably disposed around an axis (20) of a gear shaft (12) to form a ratio step for the transmission (2);
    a shift dog (18) non-rotatably connected to and axially movable along said axis (20) of said gear shaft (12) is situated between the first and the second gear wheels;
    an electromagnetic device (24,26,40) positioned axially adjacent said shift dog (18), to axially move said shift dog (18) in two directions along said axis (20) without a shift fork; and
    a first position in which an electromagnetic field generated by the electromagnetic device axially moves the shift dog in a first operational direction to engage with one of the first and the second gear wheel (4, 6) and a second position wherein the electromagnetic field generated in said electromagnetic device (24,26,40) is reversed to move the shift dog in an opposing second operational direction to disengage with one of the first and second gear wheel (4, 6), wherein
    by control of said electromagnetic device (24, 26, 40) different load reduction times can be adjusted, and wherein
    by means of the control a reversal of the electromagnetic field is produced to form a damping device against an impact of said shift dog (18) with the first and second gear wheels (4, 6).

2. The electromagnetic shift arrangement according to claim 1, wherein said shift dog (18) is retained in a neutral position between and spaced from said first and second gear wheels (4, 6) by said electromagnetic device (24, 26, 40).

3. The electromagnetic shift arrangement according to claim 1, wherein said shift dog (18) is retained in a neutral position by spring tension.

4. An electromagnetic shift arrangement for a transmission (2) comprising:
- a first gear wheel (4) and a second gear wheel (6) rotatably disposed around an axis (20) of a gear shaft (12) to form a ratio step for the transmission (2);
- a single shift dog (18) non-rotatably connected to and axially movable along said axis (20) of said gear shaft (12) is situated between the first and the second gear wheels;
- an electromagnetic device (24,26,40) positioned axially adjacent said shift dog (18), to axially move said shift dog (18) in two directions along said axis (20) without a shift fork; and
- a first position in which an electromagnetic field generated by the electromagnetic device axially moves the shift dog in a first operational direction to engage with the first gear wheel (4) and a second position wherein the electromagnetic field generated in said electromagnetic device (24,26,40) is reversed to move the shift dog in an opposing second operational direction to engage with the second gear wheel (6), wherein
- by means of the control a reversal of the electromagnetic field is produced to form a damping device against an impact of said shift dog (18) with the first and second gear wheels (4, 6), and wherein
- by control of said electromagnetic device (24, 28, 40) different load reduction times can be adjusted.

5. The electromagnetic shift arrangement according to claim 4, wherein said shift dog (18) is retained in a neutral position between and spaced from said first and second gear wheels (4, 6) by said electromagnetic device (24, 26, 40).

6. The electromagnetic shift arrangement according to claim 4, wherein said shift dog (18) is retained in a neutral position by spring tension.

7. An electromagnetic shift arrangement for a transmission (2) comprising:
- a first gear wheel (4) and a second gear wheel (6) rotatably disposed around an axis (20) of a gear shaft (12) to form a ratio step for the transmission (2);
- a single shift dog (18) for engaging one of the first and the second gear wheels is non-rotatably connected to and axially movable along said axis (20) of said gear shaft (12) between the first and the second gear wheels;
- a single moveable shift disc (22) connected to and radially supported by the shift dog about the gear shaft axis (20);
- an electromagnetic device (24, 26,40) generating a reversible electromagnetic field is positioned along the gear shaft axis (20) axially between the shift disc (22) and at least one of said first and second gear wheels; and
- wherein to move said shift dog into engagement with one of said first and second gear wheels said reversible electromagnetic field draws the moveable shift disc (22) to move in a first direction axially towards the electromagnetic device, and when reversed, repels the shift disc (22) to move in a second direction axially away from the electromagnetic device along said gear shaft axis (20).

8. The electromagnetic shift arrangement according to claim 7, wherein the electromagnetic shift device comprises a first electromagnetic shift device positioned adjacent the first gear wheel and spaced apart from a second electromagnetic shift device positioned adjacent the second gear wheel to define an axial space therebetween in which the shift disc (22) is located and axially moveable between the first and second electromagnetic shift devices.

9. The electromagnetic shift arrangement according to claim 8, the electromagnetic force further comprising a first reversible electromagnetic force to one of draw and repel the shift disc towards and away from the first electromagnetic shift device and a second reversible electromagnetic force to draw and repel the shift disc towards end away from the second electromagnetic shift device wherein one of the first and second electromagnetic forces draws the shift disc towards one of the respective first and second electromagnetic shift device, the other of the first and second electromagnetic force is reversed to repel the shift disc from the other of the first and second electromagnetic shift device.

10. The electromagnetic shift arrangement according to claim 9, further comprising a first plate spring situated axially between the first gear wherein and a first side of the shift disc and a second plate spring situated axially between the second gear wheel and a second side of the shift disc for axially supporting the moveable shift disc between the first and second gear wheels.

11. The electromagnetic shift arrangement according to claim 7, wherein the electromagnetic device (24, 26,40) comprises a single electromagnetic device generating a single reversible electromagnetic field to axially influence the shift disc (22) and move the shift dog between said first and second gear wheels.

12. The electromagnetic shift arrangement according to claim 11, wherein said single electromagnetic device is positioned axially closer to one of the first and second gear wheels than the other of the first and second gear wheels.

13. The electromagnetic shift arrangement according to claim 12, further comprising a first plate spring situated axially between the first gear wheel and a first side of the shift disc and a second plate spring situated axially between the second gear wheel and a second side of the shift disc for axially supporting the moveable shift disc between the first and second gear wheels.

14. The electromagnetic shift arrangement according to claim 13, wherein the single electromagnetic device (40) is positioned axially sandwiched between one of the first plate spring and the first gear and the second plate spring and the second gear wheel adjacent one side of said shift dog to provide for movement of said shift dog (19) in both said first and second operational directions along said gear shaft axis (20).

* * * * *